| (12) | United States Patent | (10) Patent No.: | US 9,223,716 B2 |
|---|---|---|---|
| | Wang et al. | (45) Date of Patent: | Dec. 29, 2015 |

(54) OBSTRUCTION-AWARE CACHE MANAGEMENT

(71) Applicant: The Penn State Research Foundation, University Park, PA (US)

(72) Inventors: Jue Wang, State College, PA (US); Yuan Xie, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 63 days.

(21) Appl. No.: 14/046,614

(22) Filed: Oct. 4, 2013

(65) Prior Publication Data

US 2015/0100740 A1    Apr. 9, 2015

(51) Int. Cl.
*G06F 12/08*    (2006.01)

(52) U.S. Cl.
CPC .......... *G06F 12/0888* (2013.01); *G06F 12/084* (2013.01); *G06F 12/0811* (2013.01); *G06F 2212/222* (2013.01)

(58) Field of Classification Search
CPC ... G06F 12/084; G06F 12/0842; G06F 9/466; G06F 9/5016; G06F 9/524; G06F 9/4881; G06F 12/0888; G06F 12/0811; G06F 12/0831
USPC .................. 711/147, 146, 145, 163, 152, 151
See application file for complete search history.

(56) References Cited

U.S. PATENT DOCUMENTS

| 6,704,822 | B1 * | 3/2004 | Tremblay et al. ............. 711/151 |
| 7,496,726 | B1 * | 2/2009 | Nussbaum et al. ........... 711/145 |
| 7,818,747 | B1 * | 10/2010 | Fedorova et al. ............. 711/147 |
| 8,244,990 | B2 * | 8/2012 | Moir et al. ..................... 711/154 |
| 2011/0228594 | A1 | 9/2011 | Rao et al. |

OTHER PUBLICATIONS

Dhruba Chandra, et al., "Predicting Inter-Thread Cache Contention on a Chip Multi-Processor Architecture", Proceedings of the 11th International Symposium on High-Performance Computer Architecture (HPCA-11 2005).*
Michael, Maged M., "The Balancing Act of Choosing Nonblocking Features", Communications of the ACM Academic Journal, Sep. 2013, vol. 56 Issue 9, p. 46-53.*
Qureshi and Patt, "Utility-based cache partitioning: A low-overhead, high-performance, runtime mechanism to partition shared caches," *Proceedings of the International Symposium on Microarchitecture*, 2006, pp. 423-432.
Sun et al., "A novel 3D stacked MRAM cache architecture for CMPs," *Proceedings of the International Symposium on High-Performance Computer Architecture*, 2009, pp. 239-249.
Binkert et al., "The gem5 simulator," SIGARCH Computer Architecture News 39(2): 1-7 (2011).

(Continued)

*Primary Examiner* — Pierre-Michel Bataille
(74) *Attorney, Agent, or Firm* — Fish & Richardson P.C.

(57) ABSTRACT

Processors and methods disclosed herein include a cache memory unit, n processor cores where n≥1, a controller connected to the cache memory unit and to each of the n processor cores, and n obstruction monitoring units, where each obstruction monitoring unit is connected to the controller and to a different one of the n processor cores, and where during operation of the electronic processor, each obstruction monitoring unit is configured to detect an obstruction corresponding to an operation from the processor core connected to the obstruction monitoring unit before the operation executes in the cache memory unit.

20 Claims, 6 Drawing Sheets

(56) References Cited

OTHER PUBLICATIONS

Dong et al., "Circuit and microarchitecture evaluation of 3D stacking magnetic RAM (MRAM) as universal memory replacement," Proceedings of Design Automation Conference, 2008, 554-559.

Driskill-Smith, "Latest advances and future prospects of STT-RAM," Non-Volatile Memories Workshop, 2010.

Jaleel et al., "High performance cache replacement using re-reference interval prediction (RRIP)," Proceedings of the International Symposium on Computer Architecture, 2010, 60-71.

Kawahura et al., "2Mb spin-transfer torque RAM (SPRAM) with bit-by-bit bidirectional current write and parallelizing-direction current read," IEEE Journal of Solid-State Circuits, 2008, 43(1): 109-120.

Kim et al., "A forward body-biased low-leakage SRAM cache: device and architecture considerations," Proceedings of the International Symposium on Low Power Electronics and Design, 2003, 6-9.

Kim et al., "Fair cache sharing and partitioning in a chip multi processor architecture," Proceedings of the International Conference on Parallel Architectures and Compilation Techniques, 2004, 111-122.

Nomura et al., "Ultra low power processor using perpendicular-STTMRAM/SRAM based hybrid cache toward next generation normally-off computers," Proceedings of the Annual Conference on Magnetism and Magnetic Materials, 2011, GD.03.

Smullen et al., "Relaxing non-volatillity for fast and energy-efficient STT-RAM caches," International Symposium on High Performance Computer Architecture, 2011, 50-61.

Srikantaiah et al., "Sharp control: Controlled shared cache management in chip multiprocessors," Proceedings of the International Symposium on Microarchitecture, 2009, 517-528.

Sun et al., "Multi retention level STT-RAM cache designs with a dynamic refresh scheme," Proceedings of the International Symposium on Microarchitecture, 2011, 329-337.

Thoziyoor et al., "A comprehensive memory modeling tool and its application to the design and analysis of future memory hierarchies," in Proceedings of the International Symposium on Computer Architecture, 2008, 51-62.

Tsuchida et al., "A 64Mb MRAM with clamped-reference and adequate-reference schemes," IEEE International Solid-State Circuits Conference, 2010, 258-259.

Xie et al., "PIPP: promotion/insertion pseudo-partitioning of multi-core shared caches," Proceedings of the International Symposium on Computer Architecture, 2009, 174-183.

Xu et al., "Design of last-level on-chip cache using spin-torque transfer RAM," IEEE Transactions on Very Large Scale Integration (VLSI) Systems, 2011, 19(3): 483-493.

Zhou et al., "Energy reduction for STT-RAM using early write termination," IEEE/ACM International Conference on Computer-Aided Design, 2009, 264-268.

\* cited by examiner

OBSTRUCTION-AWARE CACHE MANAGEMENT

TECHNICAL FIELD

This disclosure relates to data management in computing devices, and in particular, to cache data management in random access memory.

BACKGROUND

As the number of cores increases in modern processors, increases in memory subsystem performance are desirable to ensure that throughput is not hampered by latency during read and/or write cycles. Currently available processors are equipped with increasingly deep cache hierarchies and larger cache capacities. Cache memories on conventional processors are typically implemented using static random access memory (SRAM) and/or embedded dynamic random access memory (DRAM).

SUMMARY

This disclosure features methods and systems for implementing obstruction-aware cache management policies in a variety of memory architectures. The methods and systems disclosed herein can be used, for example, in last-level caches that are implemented using spin-torque transfer random access memory (STT-RAM). By monitoring for obstructions and directing read and/or write requests, the methods and systems disclosed herein can reduce latencies that would otherwise arise in memory due to such requests. In addition to managing requests to cache memory from a single processing core, the methods and systems disclosed herein can also manage requests from multiple cores to ensure that the cores do not block one another from accessing a shared cache memory.

In general, in a first aspect, the disclosure features an electronic processor that includes a cache memory unit, n processor cores where n≥1, a controller connected to the cache memory unit and to each of the n processor cores, and n obstruction monitoring units, where each obstruction monitoring unit is connected to the controller and to a different one of the n processor cores, where during operation of the electronic processor, each obstruction monitoring unit is configured to detect an obstruction corresponding to an operation from the processor core connected to the obstruction monitoring unit before the operation executes in the cache memory unit.

Embodiments of the electronic processor can include any one or more of the following features. During operation of the electronic processor, the controller can be configured to prevent operations that correspond to obstructions detected by the n obstruction monitoring units from executing in the cache memory unit. The number n can be 2 or more (e.g., 4 or more).

Each of the n processor cores can be connected in parallel with the controller and with one of the n obstruction monitoring units. Each obstruction monitoring unit can be configured to detect an obstruction corresponding to an operation by comparing a miss rate for the operation to an obstruction threshold value. Each obstruction monitoring unit can be configured to determine the obstruction threshold value $OAP_{th}$ according to:

$$OAP_{th} = \frac{T_{Mem} - (RD \cdot T_{Rd} + WR \cdot T_{Wr})/(RD + WR)}{T_{Mem} + T_{Wr}}$$

where $T_{Mem}$ is an average latency of a memory unit connected to the processor, $T_{Rd}$ is an average latency of read operations executed in the cache memory unit, $T_{Wr}$ is an average latency of write operations executed in the cache memory unit, RD is a number of read accesses to the cache memory unit during a sampling period, and WR is a number of write accesses to the cache memory unit during the sampling period.

The cache memory unit can be a spin-torque transfer cache memory unit.

Embodiments of the electronic processor can also include any of the other features disclosed herein, in any combination, as appropriate.

In another aspect, the disclosure features a method for controlling access to a cache memory unit in an electronic processor, the method including determining whether an operation directed to the cache memory unit from a processing core of the electronic processor is a read operation or a write operation, and if the operation is a read operation that executes unsuccessfully in the cache memory unit: (a) executing the read operation in another memory unit; (b) determining whether the read operation is a cache obstruction; and (c) writing data obtained in step (a) to the cache memory unit if the read operation is not a cache obstruction.

Embodiments of the method can include any one or more of the following features.

The method can include, if the operation is a write operation that executes successfully in the cache memory unit: (d) determining whether the write operation is a cache obstruction; and (e) executing the write operation in the cache memory unit if the write operation is not a cache obstruction. The method can include: (f) forwarding the write operation to another memory unit if the write obstruction is a cache obstruction.

The method can include, if the operation is a write operation that executes unsuccessfully in the cache memory unit: (g) determining whether the write operation is a cache obstruction; and (h) executing the write operation in the cache memory if the write operation is not a cache obstruction.

Determining whether the read operation is a cache obstruction can include: determining a miss rate for the read operation executed in the cache memory unit; comparing the miss rate for the read operation to a threshold value; and determining that the read operation is a cache obstruction if the miss rate for the read operation exceeds the threshold value. Determining whether the write operation is a cache obstruction can include: determining a miss rate for the write operation executed in the cache memory unit; comparing the miss rate for the write operation to a threshold value; and determining that the write operation is a cache obstruction if the miss rate for the write operation exceeds the threshold value.

The method can include determining the threshold value based on average latencies of read and write operations executed in the cache memory unit. The method can include determining the threshold value based on a number of read and write accesses to the cache memory unit during a sampling period. The method can include determining the threshold value $OAP_{th}$ according to:

$$OAP_{th} = \frac{T_{mem} - (RD \cdot T_{Rd} + WR \cdot T_{Wr})/(RD + WR)}{T_{Mem} + T_{Wr}}$$

where $T_{Mem}$ is an average latency of the other memory unit, $T_{Rd}$ is an average latency of read operations executed in the cache memory unit, $T_{Wr}$ is an average latency of write operations executed in the cache memory unit, RD is a number of read accesses to the cache memory unit during a sampling period, and WR is a number of write accesses to the cache memory unit during the sampling period.

The method can include using an obstruction monitoring unit connected to a processing core of the electronic processor and to the cache memory unit to determine the miss rate for the read operation and the threshold value. The method can include using the obstruction monitoring unit to compare the miss rate for the read operation to the threshold value.

The method can include using an obstruction monitoring unit connected to a processing core of the electronic processor and to the cache memory unit to determine the miss rate for the write operation and the threshold value, and to compare the miss rate for the write operation to the threshold value.

Embodiments of the method can also include any of the other features and/or steps disclosed herein, in any combination, as appropriate.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the subject matter herein, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments are set forth in the accompanying drawings and the description below. Other features and advantages will be apparent from the description, drawings, and claims.

DESCRIPTION OF DRAWINGS

Like reference symbols in the various drawings indicate like elements.

DETAILED DESCRIPTION

Introduction

Figure 1:
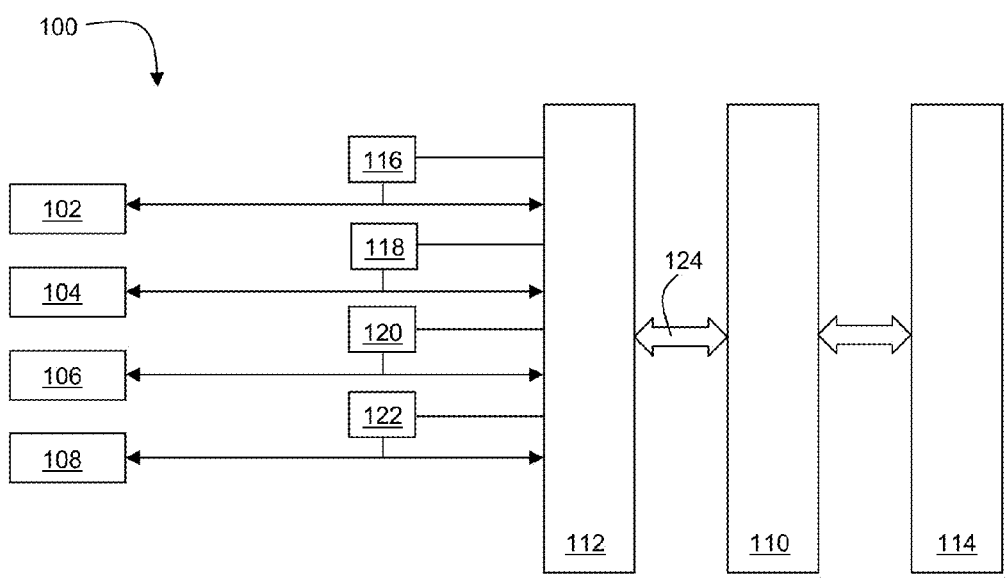
FIG. 1 is a schematic diagram of a processor with obstruction monitors connected to each of the processor cores.

In modern processors, deeper memory cache hierarchies and larger cache capacities are used to support multi-core architectures. Nonetheless, reduced size and lower power consumption are important design considerations in spite of larger cache memories. To realize these design objectives, new non-volatile memory technologies such as spin-torque transfer random access memory (STT-RAM) are being explored as alternatives to conventional static random access memory (SRAM) and dynamic random access memory (DRAM) technologies. STT-RAM is particularly well suited for use in last-level caches such as Level 3 (L3) cache due to its relatively small bitcell size (thereby reducing its physical footprint) and non-volatility (which reduces energy consumption).

STT-RAM is an enhanced variant of magnetic random access memory (MRAM) in which the basic bit storage element is a magnetic tunnel junction. Each tunnel junction includes two ferromagnetic layers, one with a fixed magnetization direction and the other with a free magnetization direction. The relative direction of magnetization in the two ferromagnetic layers is used to represent "0" and "1" bits. A switching current flowing from bitline to sourceline aligns the magnetizations in the two layers along parallel directions, which represents a "0". A switching current flowing from sourceline to bitline orients the magnetizations in the two layers along anti-parallel directions, which represents a "1".

As discussed briefly above, compared to conventional random access memory technologies such as SRAM, the advantages of STT-RAM are smaller bitcell area and lower leakage power. At present, the cell size of STT-RAM is currently in the range from 13 $F^2$ to 100 $F^2$, where F is the feature size of the lithography process (see, for example, T. Kawahara et al., "2 Mb spin-transfer torque RAM (SPRAM) with bit-by-bit bidirectional current write and parallelizing-direction current read," *IEEE Journal of Solid-State Circuits* 43(1): 109-120 (2008), and K. Tsuchida et al., "A 64 Mb MRAM with clamped-reference and adequate-reference schemes," in *Proceedings of the International Solid-State Circuits Conference*, pp. 258-259 (2010)). In contrast, current SRAM cell sizes are approximately 146 $F^2$ (see, e.g., S. Thoziyoor et al., "A comprehensive memory modeling tool and its application to the design and analysis of future memory hierarchies," in *Proceedings of the International Symposium on Computer Architecture*, pp. 51-62 (2008)). Due to its lower cell size, the use of STT-RAM can significantly reduce the amount of on-chip area occupied by memory caches.

Further, due to its non-volatility, STT-RAM has zero leakage power consumption from memory cells. In contrast, in conventional SRAM-based Level 2 memory caches fabricated using the 130-nm process for example, leakage power can be as high as 80% of the total power consumption of the cache memory. Accordingly, the use of STT-RAM can reduce cache power consumption considerably.

Table 1 summarizes various properties of a 4-bank, 8-way 8 MB SRAM cache and its STT-RAM counterpart. Simulations of the data in Table 1 were performed using NVSim according to a performance, energy, and area model based on CACTI. As is evident from Table 1, STT-RAM has significantly reduced area and leakage power relative to SRAM.

TABLE 1

| Parameter | SRAM | STT-RAM |
|---|---|---|
| Cell Factor ($F^2$) | 146 | 40 |
| Read Latency (ns) | 11.1 | 11.4 |
| Write Latency (ns) | 11.1 | 22.5 |
| Read Energy (pJ) | 15.8 | 17.5 |
| Write Energy (pJ) | 13 | 172 |
| Leakage Power (mW) | 14.1 | 0.144 |
| Area (mm$^2$) | 11.5 | 3.16 |

Unfortunately, while using STT-RAM in last-level caches such as L3 cache has numerous advantages, one potential drawback is the asymmetric speeds of read and write operations in STT-RAM. As shown in Table 1, for example, the write latency of STT-RAM can be approximately a factor of two larger than for SRAM. Moreover, the asymmetric speeds lead to a significantly higher write energy for STT-RAM. As a result, directly replacing a SRAM L3 cache with a STT-RAM cache can cause performance degradation. The problem can be even more significant in multi-core processors, where latencies associated with write processes from one core can affect processes running simultaneously on other cores.

The long write latency of STT-RAM relative to SRAM typically causes performance degradation because it leads to cache port obstruction. Last-level caches such as L3 are generally implemented using single-port memory bitcell designs due to the costs associated with implementing multi-port bitcell designs. For example, a dual-port STT-RAM cell generally requires at least 4 transistors, resulting in an increase of the cell layout area by a factor of four. For large-capacity L3 caches, such design schemes are typically cost-prohibitive.

As a result, STT-RAM caches are implemented as single-port designs, and all read and write cache operations are directed through the single access port. Thus, a lengthy ongoing STT-RAM write operation can obstruct the port, delaying subsequent pending read operations on the port and significantly degrading the overall performance of the cache. Moreover, when a single-port STT-RAM cache is used in a multi-core system, an ongoing write operation from one core can block subsequent read operations to the same cache bank from not only the same core, but from all other cores in the system as well.

Cache Management Policies

To reduce performance degradation due to STT-RAM write latency, the systems and methods disclosed herein handle read and write requests to cache memory according to a cache management policy. In particular, the systems and methods disclosed herein determine whether read and write requests correspond to cache obstructions before they are forwarded to the cache. Both read and write requests directed to the cache can operate as cache obstructions. By re-directing read and/or write requests that constitute obstructions away from the cache, latency due to pending cache requests can be reduced significantly. Furthermore, by re-directing obstructions away from the cache before they obstruct the cache rather than after the cache has already been obstructed, the systems and methods address the potential for cache obstruction in STT-RAM based memory in a pro-active, rather than reactive, manner.

Read and write requests diverted from cache memory by the cache management policy are typically re-directed to main memory, so that they are properly fulfilled. In this way, data requests from all processing cores in the system execute correctly.

FIG. 1 shows a schematic diagram of a processor 100 with a multi-level cache hierarchy. While processor 100 includes 4 cores and a 3-level cache hierarchy for illustrative purposes, it is important to note that the systems and methods disclosed herein can be used in processors with any number of cores (e.g., 1 core, 2 cores, 3 cores, 4 cores, 5 cores, 6 cores, 8 cores, 10 cores, and/or more than 10 cores) and in cache hierarchies with any number of levels (e.g., 1 level, 2 levels, 3 levels, and/or more than 3 levels). Typically, cache management is performed for the last-level cache in the processor. However, the methods and systems disclosed herein can also be implemented in other cache levels if desired.

Processor 100 includes cores 102, 104, 106, and 108, each of which includes an associated Level 2 (L2) cache. Each of the cores is connected to a single-port shared L3 cache 110, which is in turn connected to main memory 114. Read and write requests from each of cores 102, 104, 106, and 108 pass through L3 cache controller 112, which passes the requests to L3 cache 110 through port 124. Controller 112 manages the incoming read and write requests to L3 cache 110, directing the requests to access proper addresses within L3 cache 110.

Obstruction monitors 116, 118, 120, and 122 are connected cores 102, 104, 106, and 108, respectively, between the L2 cache associated with each core and the shared L3 cache. The obstruction monitors are separated from the cache memory hierarchy, allowing each obstruction monitor to determine cache access information for the core with which it is associated. Each obstruction monitor is also connected to controller 112 so that cache access information for each core is communicated to controller 112.

Figure 2:
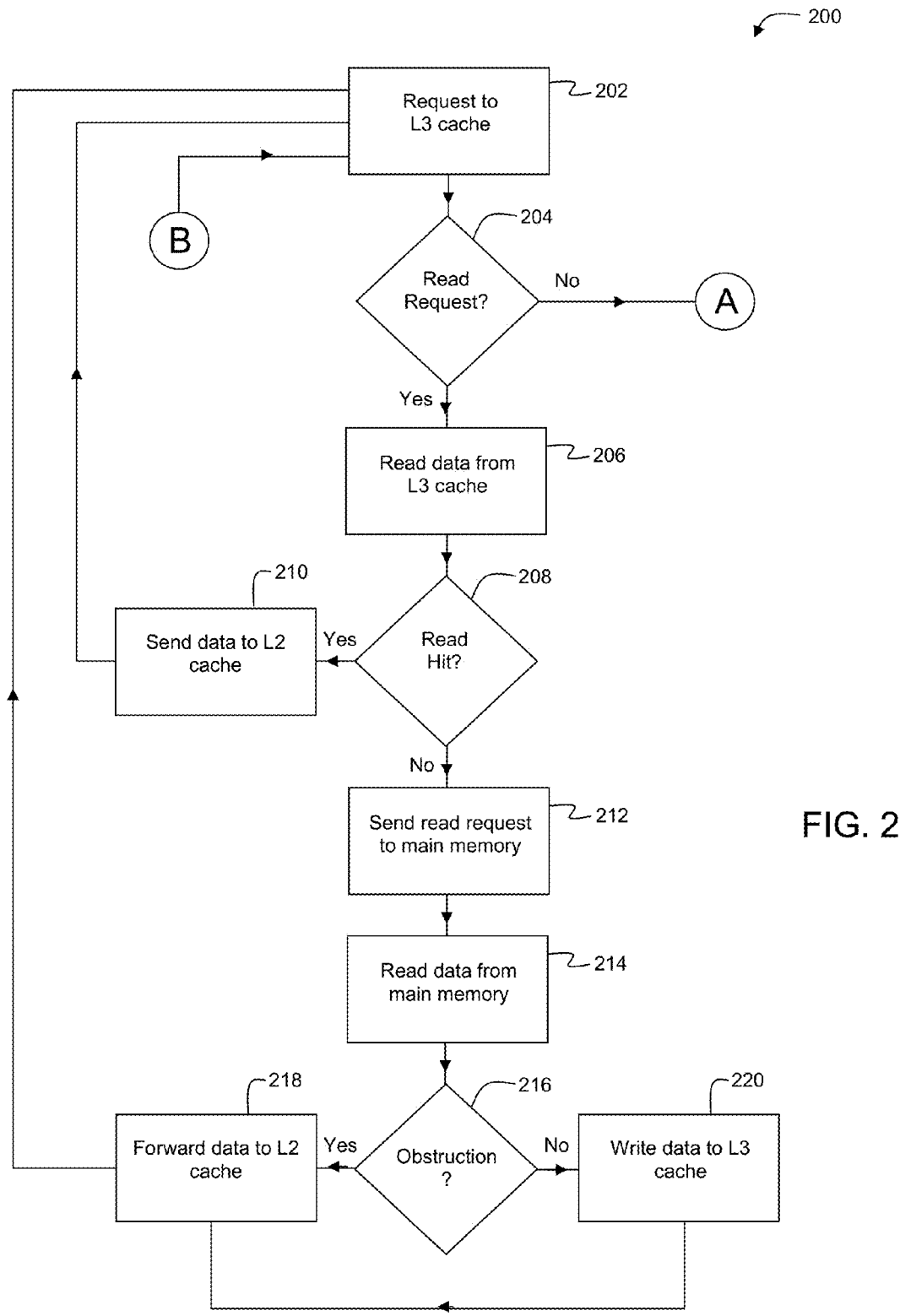
FIG. 2 is a flow chart showing a series of steps for implementing an obstruction-aware cache management policy.
Figure 2:
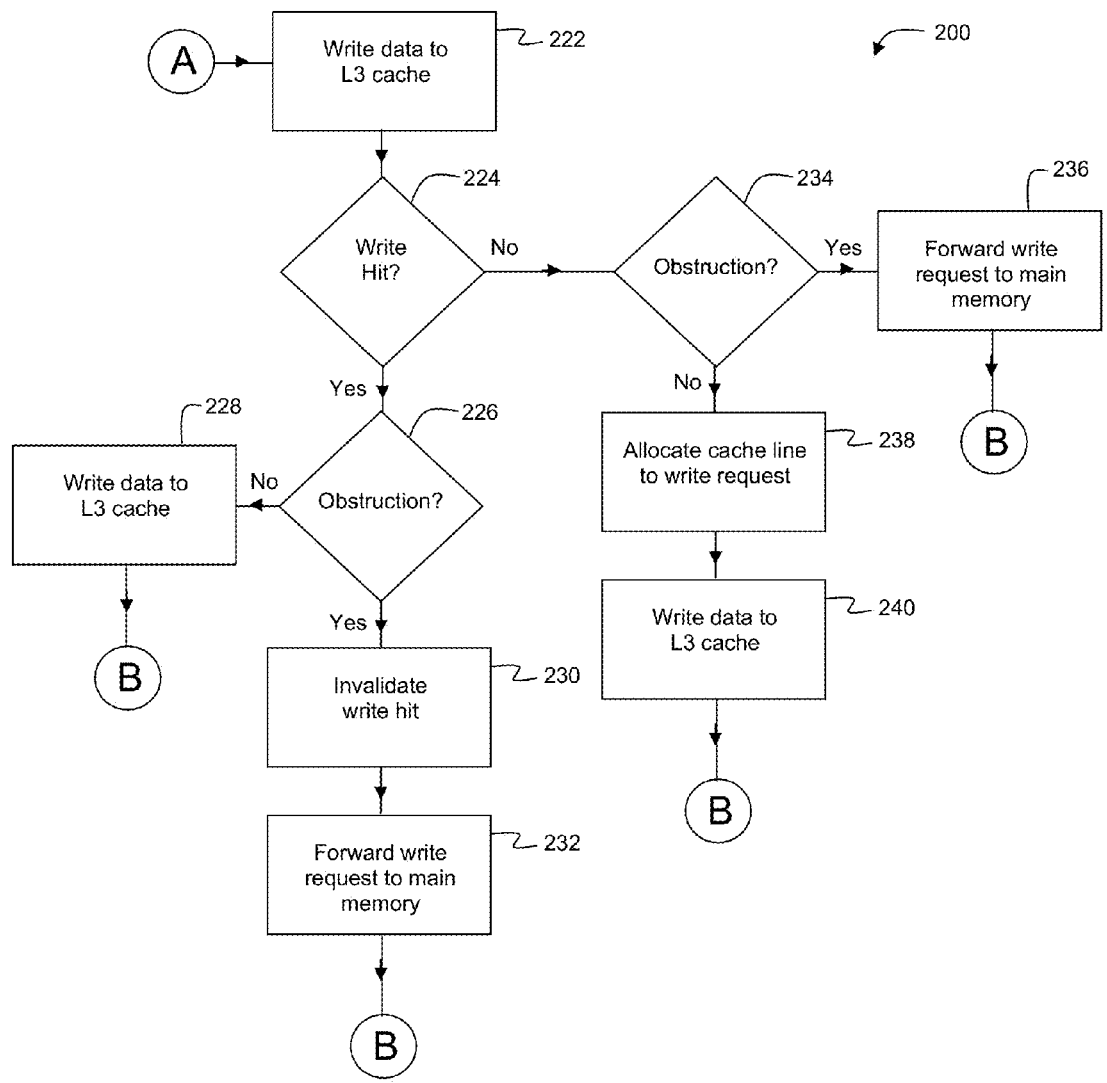

During operation of processor 100, controller 112 implements a cache management policy for L3 cache 110 that detects and responds to obstructions at port 124. FIG. 2 is a flow chart 200 showing steps in the cache management policy implemented by controller 112. Implementation of the policy begins when a read or write request from any of cores 102, 104, 106, or 108 is directed to L3 cache 110 through controller 112 in step 202. When controller 112 detects such a request, controller 112 first determines whether the request is a read request or a write request in step 204. If the request is a read request, then in step 206, controller 112 passes the read request to L3 cache 110, and an attempt is made in step 206 to read the requested data from L3 cache 110.

Next, in step 208, controller 112 determines whether the requested data was successfully read from L3 cache 110 in step 206. If the requested data was read successfully (e.g., a "read hit" occurred), then the data is passed to the L2 cache of the corresponding core in step 210, and process control returns to step 202 to await another request from one of cores 102, 104, 106, or 108 to L3 cache 110. If the requested data was not read successfully from L3 cache 110 in step 206, then the read request is directed instead to main memory 114 in step 212, and the requested data is read from main memory in step 214.

Next, in step 216, controller 112 determines whether the read request is an obstruction for L3 cache 110. The process for determining whether a read or write request is an obstruction will be described in more detail below. If the read request is a cache obstruction, then in step 218, the data read from main memory in step 214 is forwarded to the L2 cache corresponding to the core that made the request in step 202, and process control returns to step 202 to await another request from one of the cores. By not updating L3 cache 110 with the data read from main memory in step 214, controller 112 avoids obstructing L3 cache 110 with the read request.

If the read request is not determined to be a cache obstruction in step 216, then in step 220, the data read from main memory in step 214 is written to L3 cache 110 in step 220. Next, the data is forwarded to the corresponding L2 cache in step 218, and then process control returns to step 202 to await another request from one of the cores.

Returning to step 204, if the request is not a read request, then it is a write request, and in step 222, an attempt is made to execute the write request in L3 cache 110. Next, in step 224, controller 112 determines whether the write request executed successfully in step 224. If the request executed successfully (e.g., a "write hit" occurred), then controller 112 determines whether the write request is a cache obstruction. If the write request is not a cache obstruction, then in step 228, the data is written to L3 cache 110, and process control returns to step 202 to await another read or write request. If the request is a cache obstruction, then in step 230, controller 112 invalidates the "write hit" in step 230, and forwards the write request to main memory 114 in step 232. In this way, when the write request is a cache obstruction, controller 112 avoids obstructing L3 cache 110 with the write request. After the write request is executed in main memory 114, process control returns to step 202 to await another request from one of the cores.

If the write request did not execute successfully in step 224 (e.g., a "write miss" occurred), then controller 112 next determines in step 234 whether the write request is a cache obstruction. If the request is determined to be a cache obstruction, then the write request is forwarded to main memory 114 in step 236. After the write request executes in main memory 114, process control returns to step 202 to await another read or write request from one of the cores.

If controller 112 instead determines that the write request is not a cache obstruction in step 234, then controller 112 allocates a cache line to the write request in step 238, and the data is written to L3 cache 110 in step 240. Process control then returns to step 202 to await another request from one of the cores.

In the foregoing example, read and/or write requests that correspond to cache obstructions are re-directed away from L3 cache 110 in flow chart 200 to main memory 114. More generally, however, depending upon the memory architecture of processor 100, such requests can also be directed to other memory units. For example, in some embodiments, such requests can be directed to a back-up cache memory, or to another type of data storage unit.

Identifying Cache Obstructions

In steps 216, 226, and 234 of flow chart 200, controller 112 determines whether a read or write request is a cache obstruction for L3 cache 110. In this section, methods for determining whether a particular request constitutes a cache obstruction will be discussed in greater detail.

The rationale underlying adding another level of cache (e.g., a last-level cache such as L3) in memory hierarchy is to provide fast memory resources so that particular requests with spatial and temporal locality can preferentially access the cache rather than the off-chip main DRAM memory, as access to main memory is substantially more time consuming. Not all processes benefit from preferentially accessing cache memory, however.

Assuming that the behavior and characteristics of a process are not changed during the short period during which the process executes, if the data of the process is written into the last-level cache, the expected execution time T for a cache access, assuming the cache uses fetch-on-write policy, is:

$$T = P_{Rd} \times T_{Rd} + (1 - P_{Rd}) \times T_{Wr} + P_{Miss} \times (T_{Mem} + T_{Wr}) \quad (1)$$

where $P_{Rd}$ is the read/write ratio, $P_{Miss}$ is the miss rate of the cache, $T_{Rd}$ is the average latency of cache read operations, $T_{Wr}$ is the average latency of cache write operations, and $T_{Mem}$ is the average latency of main memory.

For each access miss, new data are fetched from main memory and written to the cache. The additional latency associated with fetching and writing the new data are added to the expected execution time T to yield the total time delay. On the other hand, if the new data are not written to the cache, then subsequent operations need to access main memory directly. Accordingly, the expected execution time for each access, T', is:

$$T' = T_{Mem} \quad (2)$$

If writing data from a process to cache does not yield improved performance via reduced latency, then T>T', and Equation (1) can be re-arranged to yield:

$$P_{Miss} > \frac{T_{Mem} - P_{Rd} \times T_{Rd} - (1 - P_{Rd}) \times T_{Wr}}{T_{Mem} + T_{Wr}} \quad (3)$$

When a process satisfies Equation (3) during its execution time, the process may cause intensive write operations to the cache so that writing the process data to the cache will extend the execution time, thereby degrading overall system performance. Such a process is defined as a "cache obstruction." Referring to Equation (3), it is evident that the likelihood that a given process will be a cache obstruction is higher when a STT-RAM cache is used, because the right hand side of Equation (3) becomes smaller when $T_{Wr}$ increases, making it more likely that the inequality will be satisfied. This accounts for the observation that potential performance degradation is more problematic for STT-RAM caches than for SRAM caches.

In processor 100, obstruction monitors 116, 118, 120, and 122 obtain cache access information for cores 102, 104, 106, and 108, respectively. Using the cache access information, a particular read or write process can be judged to be a cache obstruction or not an obstruction. In the following description, obstruction monitors 116, 118, 120, and 122 are configured to determine whether or not a particular process constitutes a cache obstruction. However, other components of processor 100 can also be configured to make this determination based on information obtained by the cache monitors. For example, in some embodiments, controller 112 can be configured to determine whether a read or write process is a cache obstruction.

In each of the obstruction monitors, a tunable parameter $T_{detect}$ is set, and corresponds to a time period during which the obstruction monitor detects possible cache obstructions. Each period $T_{detect}$ is divided by the obstruction monitor into two parts: a first period $T_{samp}$ during which the processor cache operates under an ordinary cache management policy (e.g., under a policy that does not detect cache obstructions) and during which each obstruction monitor measures information about cache access by its corresponding core; and a second period $T_{obs}$ during which the cache is managed according to a cache policy that uses information about cache obstructions collected during the first period.

During the first period $T_{samp}$, it is assumed that all read and write processes are not cache obstructions. Each obstruction monitor measures quantities relating to cache access by its corresponding core. These quantities include the execution time currentTime, the number of read accesses RD, the number of write accesses WR, and the number of cache misses Miss. At the end of the first period $T_{samp}$, each obstruction monitor calculates two parameters, the actual miss rate MissR and the obstruction threshold $OAP_{th}$, as follows:

$$MissR = \frac{Miss}{RD + WR} \qquad (4)$$

$$OAP_{th} = \frac{T_{Mem} - (RD \cdot T_{Rd} + WR \cdot T_{Wr})/(RD + WR)}{T_{Mem} + T_{Wr}} \qquad (5)$$

If the actual miss rate MissR determined using Equation (4) is larger than the obstruction threshold $OAP_{th}$, then the process corresponds to a cache obstruction. Otherwise, the process is not a cache obstruction. During the remainder of the second period $T_{obs}$, the process is treated as either as an obstruction or not an obstruction based on the comparison between the values of MissR and $OAP_{th}$, until the next sample period $T_{samp}$ begins.

The algorithm that executes on each obstruction monitor during runtime can be represented as follows:

```
Input: New request sent to cache memory
Output: Status of request as cache obstruction or not an obstruction
Parameters: T_detect, T_samp, T_obs, MissR, OAP_th
if currentTime − startTime == T_detect then
    reset all parameters
    label process as non-obstruction
    startTime ← currentTime
endif
if currentTime − startTime < T_samp then
    if packetIsRead then
        RD++            // Update read access count
    else
        WR++            // Update write access count
    end if
    if packetIsMiss then
        Miss++          // Update miss count
    end if
end if
if currentTime − startTime == T_detect then
    calculate OAP_th, MissR
    if MissR > OAP_th then
        label process as obstruction
    else
        label process as non-obstruction
    end if
end if
```

The comparison between MissR and $OAP_{th}$ can be performed by different components of processor 100. In some embodiments, each of the obstruction monitors compare the values of MissR and $OAP_{th}$ for their corresponding cores to determine whether processes specific to the cores are cache obstructions. In certain embodiments, the obstruction monitors forward values of MissR and $OAP_{th}$ for each core to controller 112, which performs each comparison to determine whether processes specific to each core are cache obstructions.

EXAMPLES

The subject matter disclosed herein is further described in the following examples, which are not intended to limit the scope of the claims.

The additional hardware overhead imposed by obstruction monitors 116, 118, 120, and 122 was simulated using the Synopsys Design Compiler with a 45 nm TSMC CMOS library. As simulated, the obstruction monitor circuitry occupied only 0.06 mm$^2$ on the chip, which is negligible compared to the total area of the L3 cache (which typically occupies approximately half of the total chip area). The simulation results also demonstrated that it is straightforward to integrate the obstruction-aware cache policy logic into a conventional cache controller using bypass circuits. With regard to latency overhead, the obstruction monitors are separated from the cache hierarchy and controller 112, and thus they introduce only a few branch decisions in the overall processor control flow. Accordingly, no additional latency due to the obstruction monitors was introduced in the simulations.

To investigate the effects of obstruction-aware cache management policies, a 1.5 GHz 4-core out-of-order ARMv7 microprocessor was modeled using a modified version of gem5 (which is described, for example, in N. Binkert et al., "The gem5 simulator," *SIGARCH Computer Architecture News* 39(2): 1-7 (2011)). The gem5 simulator was modified to include an asymmetric read/write latency model, a banked cache model, and a sophisticated cache write-buffer scheme. The write-buffer scheme is commonly used in conventional cache architecture to mask performance penalties due to write operations. However, the write-buffer size cannot be too large because of its fully-associative lookup overhead. Thus write-buffer techniques alone are not sufficient to compensate for performance degradation due to the long write latency of STT-RAM. An 8-entry write buffer was used for the simulations described herein.

Various simulation settings that were used are listed in Table 2. All circuit-level cache module parameters (e.g., read latency and write latency) were obtained from NVSim and were consistent with Table 1. NVSim is described, for example, in X. Dong et al., "NVSim: A circuit-level performance, energy, and area model for emerging non-volatile memory," *IEEE Transactions on Computer-Aided Design of Integrated Circuits and Systems* 31(7): 994-1007 (2012). The simulation workloads were taken from the SPEC CPU2006 benchmark suite and are described, for example, at internet address www.spec.org/cup2006/. Each simulation was performed for at least 2 billion instructions. The obstruction monitor sampling period was 0.1 million cycles, and the launching period was set at 10 million cycles.

Instructions per cycle (IPC) were used as the performance metric. To account for both fairness and performance, the geometric mean was used to average results for the 4 cores and determine the speedup metric as:

$$\text{speedup} = \text{geometric\_mean}\left(\frac{IPC_i}{IPC_i^{baseline}}\right) \qquad (6)$$

Determination of the speedup metric is described, for example, in Y. Xie et al., "PIPP: promotion/insertion pseudo-partitioning of multi-core shared caches," *Proceedings of the International Symposium on Computer Architecture*, pp. 174-183 (2009).

TABLE 2

| Core | | 4-core, 1.5 GHz out-of-order ARM processor |
|---|---|---|
| SRAM I-L1/D-L1 Caches | | private, 32 KB/32 KB, 16-way, LRU, 64 B cache line, write-back, write allocate, 8-cycle read, 8-cycle write |
| L3 Cache | Common | shared, 8 MB, 8-way, LRU, 4 banks, 8-entry write buffer per bank, 64 B cache line, write-back, write allocate |
| | Obstruction-Aware STT-RAM | 17-cycle read, 34-cycle write, with obstruction-aware management policy |
| | Baseline STT-RAM | 17-cycle read, 34-cycle write, with no obstruction-aware management policy |
| | Baseline SRAM | 17-cycle read, 17-cycle write |
| DRAM Main Memory | | 4 GB, 128-entry write buffer, 200-cycle |

Example 1

In the first example, to illustrate the write latency of STT-RAM, two workload mixtures were simulated. In the first mixture, mix1, four last-level cache friendly workloads (omnetpp, hmmer, bwaves, and astar) were run on the 4-core simulated system. In the second mixture, mix2, the first workload omnetpp was replaced by cactusADM.

Figure 3:
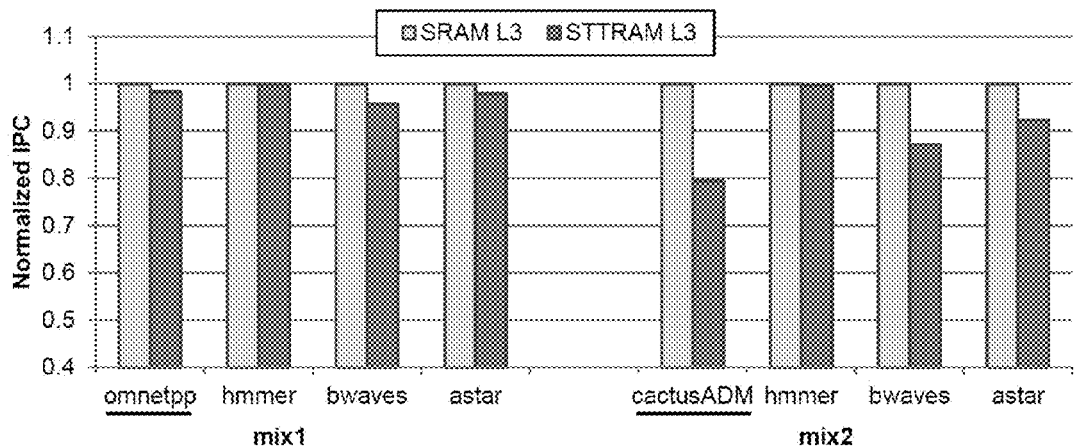
FIG. 3 is a graph showing instructions per cycle for systems with SRAM L3 cache and STT-RAM L3 cache.

FIG. 3 is a graph showing normalized instructions per cycle (IPC) for each workload in each of mix1 and mix2, on both SRAM and STT-RAM L3 caches. For mix1, IPC for each workload was reduced by less than 5% when SRAM was used in place of STT-RAM in the L3 cache. However, for mix2, the core running the cactusADM workload has reduced IPC of about 21% using a STT-RAM L3 cache in place of a SRAM L3 cache, and IPC is reduced for each of the other workloads by 8% to 13% using STT-RAM in place of SRAM in the L3 cache.

The simulation results show that certain processes such as the cactusADM workload constitute cache obstructions that, when executed in a multi-core system with a STT-RAM L3 cache, will experience performance loss. Such processes can also negatively affect the performance of other processes (e.g., the other three workloads in mix2) in the system. Accordingly, the results demonstrate the effects of having no cache management policy for STT-RAM based L3 caches.

Example 2

To demonstrate the effect of an obstruction-aware cache management policy, different processes were simulated on STT-RAM L3 caches with and without the cache management policies disclosed herein. In 8 different simulations, each of the 4 cores on the simulated processor executed the same process. In a further 8 simulations, the 4 cores on the simulated processor executed a mixture (e.g., "mix1" through "mix8") of different processes. Table 3 lists the processes in each of the 8 mixtures that were simulated.

TABLE 3

| Simulation | Processes |
|---|---|
| mix1 | lbm + libquantum + sjeng + cactusADM |
| mix2 | povray + mcf + namd + lbm |
| mix3 | bwaves + cactusADM + astar + hmmer |
| mix4 | gcc + lbm + libquantum + bwaves |
| mix5 | cactusADM + gcc + mcf + lbm |
| mix6 | libquantum + bzip2 + bwaves + cactusADM |
| mix7 | lbm + sjeng + bzip2 + libquantum |
| mix8 | mcf + bwaves + sjeng + lbm |

Figure 4:
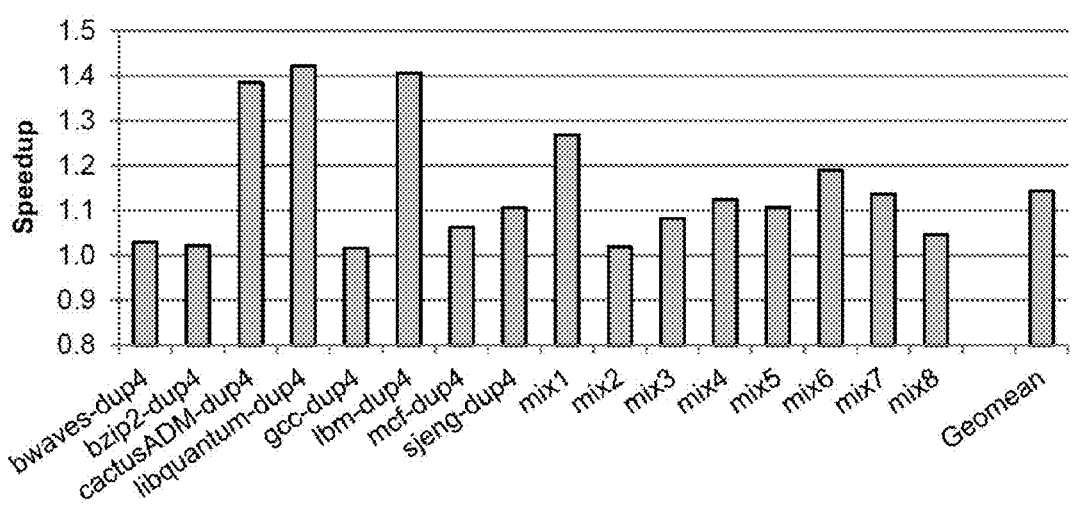
FIG. 4 is a graph showing the speedup factor for different individual processes and mixtures of processes on an STT-RAM L3 cache with an obstruction-aware cache management policy.

FIG. 4 is a graph showing the speedup, calculated according to Equation (6), that is realized using an obstruction-aware cache management policy with STT-RAM L3 cache, relative to a STT-RAM L3 cache with a conventional (e.g., non-obstruction-aware) cache management policy. The simulation results show that after adopting the obstruction-aware cache management policy, system performance improves by an average of 14%, and by up to 42% for specific processes.

In general, processes or mixtures of processes that include more cache obstructions benefit more significantly from obstruction-aware cache management policies. Because obstruction monitors can quickly detect cache obstructions during sampling periods, the cache controller can skip unnecessary write operations to the L3 cache for such obstructions. For simulations with a mixture of processes, performance improvements were realized from two sources. First, the performance of individual processes that correspond to cache obstructions was increased because the cache management policy skips unnecessary cache write operations for such processes, thereby eliminating the slowdown associated with longer write latency for those processes. Second, the performance of other, concurrently running processes is also improved since L3 cache port obstructions are reduced and the requests of the concurrently running processes can therefore be satisfied more quickly. In addition, the number of L3 cache lines available for non-obstruction processes is increased because the number of lines allocated to obstruction processes is reduced. Accordingly, the hit rate for non-obstruction processes is increased.

Example 3

To compare STT-RAM and SRAM L3 caches, a series of simulations was performed with both duplicates and mixtures of processes running on the 4-cores of the simulated processor. The simulated SRAM L3 cache was configured as shown in Table 2. STT-RAM L3 caches with ("OAP-STTRAM L3") and without ("STTRAM L3") obstruction-aware cache management policies were also simulated as in Table 2.

In 8 of the simulations, the same process was duplicated on each of the 4 cores. In 8 additional simulations, a different mixtures of processes were run on the 4 cores. The mixtures of processes used, designed mix1 through mix8, are shown in Table 3.

Figure 5:
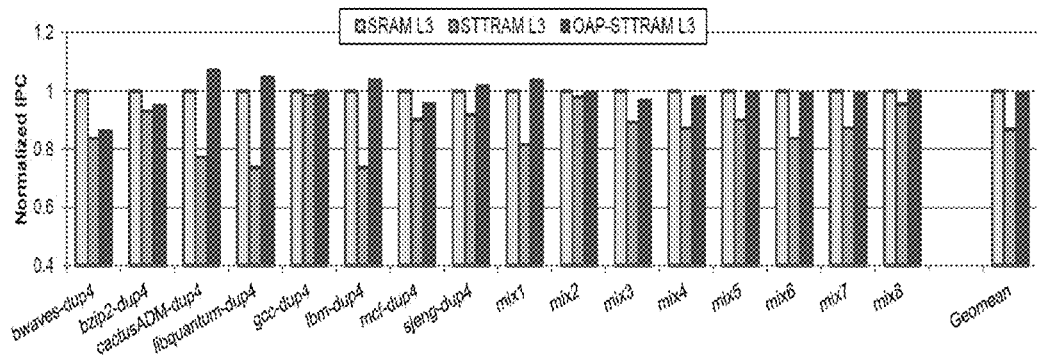
FIG. 5 is a graph showing instructions per cycle for systems with SRAM L3 cache, STT-RAM L3 cache with a conventional cache management policy, and STT-RAM L3 cache with an obstruction-aware cache management policy, running different processes.

FIG. 5 shows normalized instructions per cycle (IPC) for simulated systems with SRAM last-level cache ("SRAM L3"), with STT-RAM last-level cache and a conventional cache management policy ("STTRAM L3"), and with STT-RAM last-level cache and an obstruction-aware cache management policy as disclosed herein ("OAP-STTRAM L3"). The results show that compared to systems with SRAM L3 cache, STT-RAM L3 cache with a conventional cache management policy degrades system performance by 13.2% on average due to the longer write latency of STT-RAM. However, STT-RAM L3 cache with an obstruction-aware cache management policy as disclosed herein degrades system performance by only 0.7% on average, a marked improvement relative to conventional cache management policies.

In addition to performance improvements, using an obstruction-aware cache management policy with STT-RAM L3 cache can also yield energy savings relative to SRAM L3 cache. The reduced energy consumption arises because leakage power dominates energy consumption in L3 cache, and the leakage power of STT-RAM is only about 1% as large as the leakage power of conventional SRAM.

Figure 6:
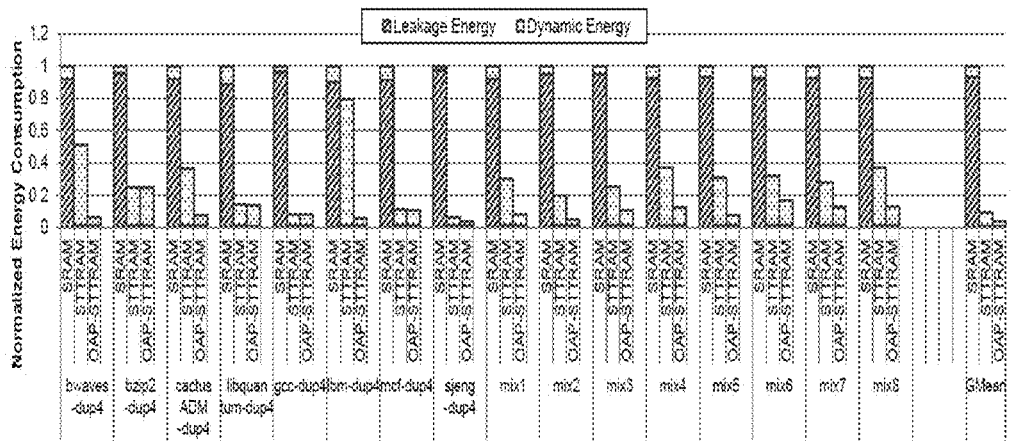
FIG. 6 is a graph showing energy consumption for systems with SRAM L3 cache, STT-RAM L3 cache with a conventional cache management policy, and STT-RAM L3 cache with an obstruction-aware cache management policy, running different processes.

FIG. 6 shows normalized energy consumption for each of the three simulated systems (SRAM L3, STTRAM L3, and OAP-STTRAM L3) running the same duplicate processes and mixtures of processes as in FIG. 5. Due to leakage energy reduction, an 8 MB STT-RAM L3 cache reduces total energy consumption compared to a SRAM L3 cache by about 90%. The STT-RAM L3 cache with an obstruction-aware cache management policy further reduces total energy consumption by an additional 64%.

Yet another advantage of using a STT-RAM L3 cache rather than a SRAM L3 cache is the reduced on-chip area occupied by the STT-RAM L3 cache. Compared to an 8 MB SRAM L3 cache, an 8 MB STT-RAM L3 cache occupies 72.5% less chip area, as shown in Table 1.

Hardware and Software Implementation

The method steps and procedures described herein can be implemented in hardware or in software, or in a combination of both. In particular, processor 100 can include software and/or hardware instructions to perform any of the method steps disclosed above. The methods can be implemented in computer programs using standard programming techniques following the method steps and figures disclosed herein. Program code is applied to input data to perform the functions described herein. The output information is applied to one or more output devices such as a printer, or a display device, or a web page on a computer monitor with access to a website, e.g., for remote monitoring.

Each program is preferably implemented in a high level procedural or object oriented programming language to communicate with a processor. However, the programs can be implemented in assembly or machine language, if desired. In any case, the language can be a compiled or interpreted language. Each computer program can be stored on a storage medium or device (e.g., an electronic memory) readable by the processor, for configuring and operating the processor to perform the procedures described herein. Each computer program can be encoded directly in the logic circuitry of the processor.

Figure 7:
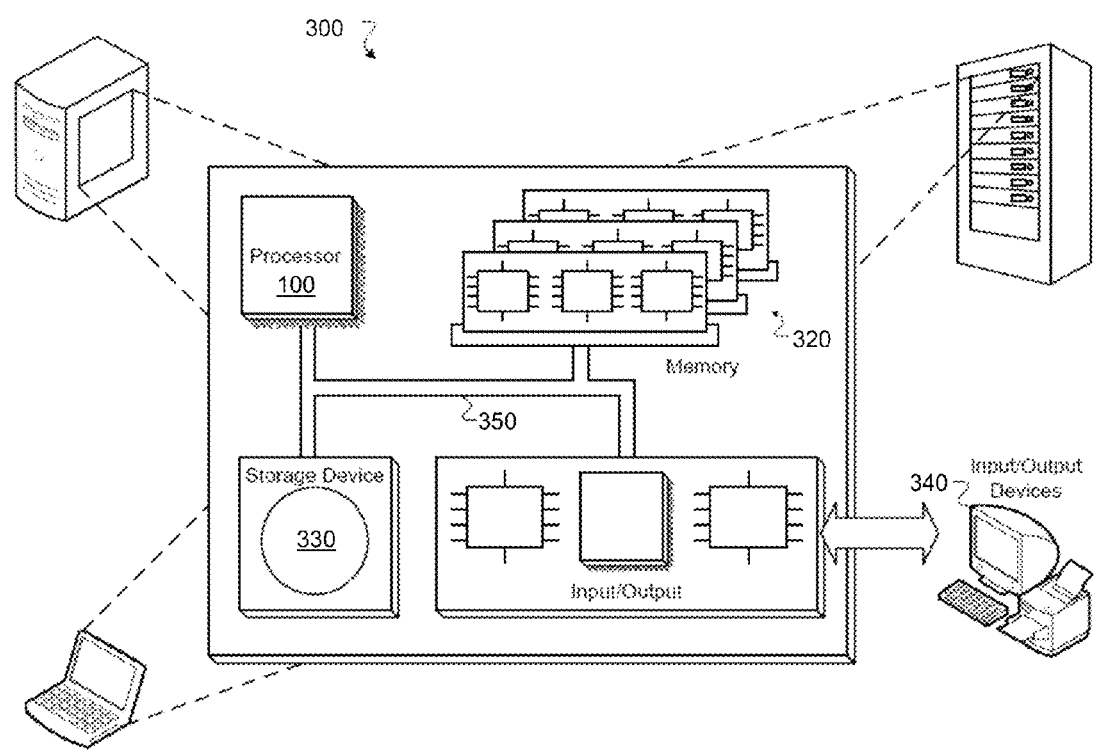
FIG. 7 is a schematic diagram of a computer system that includes the processor of FIG. 1.

FIG. 7 is a schematic diagram of a computer system 300, which processor 100 disclosed herein can be a component. As shown in FIG. 7, system 300 includes processor 100, a memory 320 (e.g., a main memory), a storage device 330, and an input/output device 340. Each of the components 100, 320, 330, and 340 are interconnected using a system bus 350. Processor 100 is capable of processing instructions for execution within the system 300. In some embodiments, processor 100 is a single-threaded processor. In certain embodiments, processor 100 is a multi-threaded processor. In some embodiments, processor 100 is a single core processor. In certain embodiments, processor 100 features multiple processing cores.

Processor 100 is capable of processing instructions stored in memory 320 or on the storage device 330 to display graphical information for a user interface on the input/output device 340. Memory 320 stores information within the system 300. In some embodiments, memory 320 is a computer-readable medium. Memory 320 can include volatile memory and/or non-volatile memory. In general, memory 320 can include any of the types and architectures of main memory disclosed herein.

Storage device 330 is capable of providing mass storage for the system 300. In general, storage device 330 can include any non-transitory tangible media configured to store computer readable instructions. In some embodiments, storage device 330 is a computer-readable medium. In certain embodiments, storage device 330 may be a floppy disk device, a hard disk device, an optical disk device, or a tape device.

Input/output device 340 provides input/output operations for the system 300. In some embodiments, input/output device 340 includes a keyboard and/or pointing device. In some embodiments, input/output device 340 includes a display unit for displaying graphical user interfaces.

The features described can be implemented in digital electronic circuitry, or in computer hardware, firmware, or in combinations of them. The features can be implemented in a computer program product tangibly embodied in an information carrier, e.g., in a machine-readable storage device, for execution by a programmable processor; and features can be performed by a programmable processor executing a program of instructions to perform functions of the described embodiments by operating on input data and generating output. The described features can be implemented in one or more computer programs that are executable on a programmable system including at least one programmable processor coupled to receive data and instructions from, and to transmit data and instructions to, a data storage system, at least one input device, and at least one output device. A computer program includes a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

In particular, the features and methods disclosed herein can be implemented in digital electronic circuitry and/or logic encoded in processor 100 and/or in another component of system 300. In some embodiments, the encoding medium is a non-volatile storage medium such as one or more read-only memory chips that can be accessed by processor 100 during runtime.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Computers include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Processor 100 carries out instructions related to a computer program, including any of the instructions disclosed herein. Processor 100 can include hardware such as logic gates, adders, multipliers and counters. Processor 100 can further include a separate arithmetic logic unit (ALU) that performs arithmetic and logical operations.

Other Embodiments

The methods and systems disclosed herein have been discussed for use with STT-RAM caches, as such caches have write latencies which exceed their read latencies, which can result in cache obstructions. More generally, however, the methods and systems disclosed herein can be used with a variety of different memory types and architectures including, for example, other types of memory with asymmetric read and write latencies. In addition, the methods and systems disclosed herein can be used with memory types that do not have significant differences in read and write latencies.

A number of embodiments have been described. Nevertheless, it will be understood that various modifications may be made without departing from the spirit and scope of the disclosure. Accordingly, other embodiments are within the scope of the following claims.

What is claimed is:

1. A method for controlling access to a cache memory unit in an electronic processor, the method comprising:
    determining whether an operation directed to the cache memory unit from a processing core of the electronic processor is a read operation or a write operation; and
    if the operation is a read operation that executes unsuccessfully in the cache memory unit:
        (a) executing the read operation in another memory unit;
        (b) determining whether the read operation is a cache obstruction by determining a miss rate for the read operation and an obstruction threshold value based on execution of the read operation in the cache memory unit by the processing core; and
        (c) writing data obtained in step (a) to the cache memory unit if the read operation is not a cache obstruction.

2. The method of claim 1, further comprising, if the operation is a write operation that executes successfully in the cache memory unit:
    (d) determining whether the write operation is a cache obstruction; and
    (e) executing the write operation in the cache memory unit if the write operation is not a cache obstruction.

3. The method of claim 2, further comprising (f) forwarding the write operation to another memory unit if the write obstruction is a cache obstruction.

4. The method of claim 2, further comprising, if the operation is a write operation that executes unsuccessfully in the cache memory unit:
    (g) determining whether the write operation is a cache obstruction; and
    (h) executing the write operation in the cache memory if the write operation is not a cache obstruction.

5. The method of claim 2, wherein determining whether the write operation is a cache obstruction comprises:
    determining a miss rate for the write operation executed in the cache memory unit;
    comparing the miss rate for the write operation to a second obstruction threshold value; and
    determining that the write operation is a cache obstruction if the miss rate for the write operation exceeds the second obstruction threshold value.

6. The method of claim 5, further comprising using an obstruction monitoring unit connected to a processing core of the electronic processor and to the cache memory unit to determine the miss rate for the write operation and the second obstruction threshold value, and to compare the miss rate for the write operation to the second obstruction threshold value.

7. The method of claim 1, wherein determining whether the read operation is a cache obstruction comprises:
    measuring information about cache access by the processing core during a sampling period of execution of the read operation in the cache memo unit;
    determining, based on the measured cache access information, the miss rate for the read operation executed in the cache memory unit and the obstruction threshold value at the end of the sampling period;
    comparing the miss rate for the read operation to the obstruction threshold value; and
    determining that the read operation is a cache obstruction if the miss rate for the read operation exceeds the obstruction threshold value.

8. The method of claim 7, further comprising determining the obstruction threshold value based on average latencies of read and write operations executed in the cache memory unit.

9. The method of claim 7, further comprising determining the obstruction threshold value based on a number of read and write accesses to the cache memory unit during the sampling period.

10. The method of claim 7, further comprising using an obstruction monitoring unit connected to a processing core of the electronic processor and to the cache memory unit to determine the miss rate for the read operation and the obstruction threshold value.

11. The method of claim 10, further comprising using the obstruction monitoring unit to compare the miss rate for the read operation to the obstruction threshold value.

12. The method of claim 1, wherein determining the obstruction threshold value comprises:
    determining the obstruction threshold value $OAP_{th}$ according to:

$$OAP_{th} = \frac{T_{Mem} - (RD \cdot T_{Rd} + WR \cdot T_{Wr})/(RD + WR)}{T_{Mem} + T_{Wr}}$$

where $T_{Mem}$ is an average latency of the other memory unit, $T_{Rd}$ is an average latency of read operations executed in the cache memory unit, Twr is an average latency of write operations executed in the cache memory unit, RD is a number of read accesses to the cache memory unit during the sampling period, and WR is a number of write accesses to the cache memory unit during the sampling period.

13. An electronic processor, comprising:
    a cache memory unit;
    n processor cores, wherein $n \geq 1$;
    a controller connected to the cache memory unit and to each of the n processor cores; and
    n obstruction monitoring units, wherein each obstruction monitoring unit is connected to the controller and to a respective one of the n processor cores,
    wherein during operation of the electronic processor, each obstruction monitoring unit is configured to detect an obstruction corresponding to an operation from the respective processor core connected to the obstruction monitoring unit by determining a miss rate for the operation and an obstruction threshold value based on execution of the operation in the cache memory unit by the respective processor core.

14. The electronic processor of claim 13, wherein during operation of the electronic processor, the controller is configured to prevent operations that correspond to obstructions detected by the n obstruction monitoring units from executing in the cache memory unit.

15. The electronic processor of claim 13, wherein n is 2 or more.

16. The electronic processor of claim 13, wherein n is 4 or more.

17. The electronic processor of claim 13, wherein each of the n processor cores is connected in parallel with the controller and with one of the n obstruction monitoring units.

18. The electronic processor of claim 13, wherein each obstruction monitoring unit is configured to detect an obstruction corresponding to an operation by:
  measuring information about cache access by the respective processor core during a sampling period of execution of the operation in the cache memory unit,
  determining, based on the measured cache access information, the miss rate and the obstruction threshold value at the end of the sampling period,
  comparing the miss rate for the operation to the obstruction threshold value, and
  determining that the operation is a cache obstruction if the miss rate exceeds the obstruction threshold value.

19. The electronic processor of claim 13, wherein each obstruction monitoring unit is configured to determine the obstruction threshold value $OAP_{th}$ according to:

$$OAP_{th} = \frac{T_{Mem} - (RD \cdot T_{Rd} + WR \cdot T_{Wr})/(RD + WR)}{T_{Mem} + T_{Wr}}$$

where $T_{Mem}$ is an average latency of a memory unit connected to the processor, $T_{Rd}$ is an average latency of read operations executed in the cache memory unit, $T_{Wr}$ is an average latency of write operations executed in the cache memory unit, RD is a number of read accesses to the cache memory unit during the sampling period, and WR is a number of write accesses to the cache memory unit during the sampling period.

20. The electronic processor of claim 13, wherein the cache memory unit is a spin-torque transfer cache memory unit.

* * * * *